(12) United States Patent
Keralapura Manjunatha et al.

(10) Patent No.: US 12,229,695 B2
(45) Date of Patent: *Feb. 18, 2025

(54) CONTENT PROVIDER RECOMMENDATIONS TO IMPROVE TARGETING AND OTHER SETTINGS

(71) Applicant: GOOGLE LLC, Mountain View, CA (US)

(72) Inventors: Mahesh Keralapura Manjunatha, Mountain View, CA (US); Chiu Wah So, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,026

(22) Filed: Apr. 28, 2023

(65) Prior Publication Data

US 2023/0259837 A1 Aug. 17, 2023

Related U.S. Application Data

(63) Continuation of application No. 16/756,347, filed as application No. PCT/US2019/065733 on Dec. 11, 2019, now Pat. No. 11,669,784.

(51) Int. Cl.
*H04L 47/11* (2022.01)
*G06F 18/22* (2023.01)
(Continued)

(52) U.S. Cl.
CPC ............. *G06Q 10/04* (2013.01); *G06F 18/22* (2023.01); *H04L 47/11* (2013.01); *H04L 47/215* (2013.01); *H04L 65/612* (2022.05); *H04L 67/53* (2022.05)

(58) Field of Classification Search
CPC ... H04L 47/215; H04L 47/11; H04L 65/4084; H04L 67/20; G06K 9/6215; G06Q 10/04;
(Continued)

(56) References Cited

U.S. PATENT DOCUMENTS 6,240,389 B1 5/2001 Keiller et al.
10,353,863 B1 7/2019 Deshpande et al.
(Continued)

FOREIGN PATENT DOCUMENTS

JP 2008-226248 A 9/2008
JP 2010-026792 A 2/2010
(Continued)

OTHER PUBLICATIONS

International Search Report and Written Opinion for Application No. PCT/US2019/065733, dated Aug. 10, 2020.
(Continued)

*Primary Examiner* — Mounir Moutaouakil
(74) *Attorney, Agent, or Firm* — MARSHALL, GERSTEIN & BORUN LLP

(57) ABSTRACT

At least one aspect of the present disclosure is directed to systems and methods of pruning retrieval tokens from sets of retrieval tokens based on criteria. The system can receive a plurality of retrieval tokens including a second retrieval token. The system can retrieve an indication of a first token and a plurality of requests. The system can construct a first bit string based on the predicted requests and the first retrieval token. The system can retrieve a second bit string corresponding to the second retrieval token. The system can compare the first bit string to the second bit string to determine a similarity value. The system can determine the similarity value is greater than a predetermined threshold. The system can remove the first and second retrieval token
(Continued)

from the plurality to create a pruned set of retrieval tokens. The system can provide the pruned set to a content.

12 Claims, 7 Drawing Sheets

(51) Int. Cl.
*G06Q 10/04* (2023.01)
*H04L 47/215* (2022.01)
*H04L 65/612* (2022.01)
*H04L 67/53* (2022.01)

(58) Field of Classification Search
CPC .......................... G06Q 30/0241; G06Q 50/10; G06F 16/9535; G06F 16/9035
See application file for complete search history.

(56) References Cited

U.S. PATENT DOCUMENTS

| | | | |
|---|---|---|---|
| 10,628,418 B2 | 4/2020 | Weyerhaeuser et al. | |
| 10,929,360 B2 | 2/2021 | Baer et al. | |
| 11,526,784 B2 * | 12/2022 | Ramasamy | G06N 5/04 |
| 11,669,784 B2 * | 6/2023 | Manjunatha | H04L 47/215 |
| | | | 370/235 |
| 2006/0253429 A1 | 11/2006 | Raghavan et al. | |
| 2010/0293048 A1 * | 11/2010 | Singolda | G06Q 30/02 |
| | | | 705/14.43 |
| 2011/0264507 A1 | 10/2011 | Zhou et al. | |
| 2014/0233923 A1 | 8/2014 | Bradley et al. | |
| 2017/0147615 A1 | 5/2017 | Barykin et al. | |
| 2017/0324813 A1 | 11/2017 | Jain et al. | |
| 2020/0142930 A1 | 5/2020 | Wang et al. | |

FOREIGN PATENT DOCUMENTS

| | | |
|---|---|---|
| JP | 2012-037920 A | 2/2012 |
| JP | 2016-177620 A | 10/2016 |

OTHER PUBLICATIONS

Notice of Reasons for Rejection for Japenese Application No. 2020-520505, dated Mar. 14, 2022.
First Examination Report for India Application No. 20202701401, dated Jul. 18, 2022.
Notice of Reasons for Rejection for Japenese Application No. 2022-180535, dated Dec. 18, 2023.

* cited by examiner

CONTENT PROVIDER RECOMMENDATIONS TO IMPROVE TARGETTING AND OTHER SETTINGS

CROSS-REFERENCE TO RELATED APPLICATIONS

The present application is a continuation of U.S. patent application Ser. No. 16/756,347, entitled "CONTENT PROVIDER RECOMMENDATIONS TO IMPROVE TARGETING AND OTHER SETTINGS," and filed Apr. 15, 2020, which is a U.S. National Phase of International Patent App. No. PCT/US2019/065733, entitled "CONTENT PROVIDER RECOMMENDATIONS TO IMPROVE TARGETING AND OTHER SETTINGS," and filed Dec. 11, 2019, the entire disclosures of each of which are incorporated by reference herein.

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item.

Third-party content items may be selected, in some implementations, via the use of positive and negative retrieval tokens. A positive retrieval token may indicate to a content selection platform that the content item associated with the retrieval token should be inserted into information resources that have attributes that match those of the positive retrieval token. In contrast, negative retrieval tokens can indicate to the content selection platform that the associated content should not be inserted into information resource that have attributes that match those of the negative retrieval token. In this way, content providers can use lists of retrieval tokens, both positive and negative, to tune which information resources can include their content items.

However, determining which combinations of retrieval tokens maximize the targetable information resources is a computationally difficult task, because it can include estimating the impact of each possible permutation of the retrieval tokens provided by the content provider. Many content providers utilize hundreds to thousands of retrieval tokens, making iterative estimation of each permutation nearly computationally infeasible, and well beyond the capability of any human. As a result, implementations of content providers not using the systems and methods discussed herein are limited to guesses or hunches about which combination of retrieval tokens has what effect. This may result in erroneous content selection, and transmission of undesired or non-optimal content, wasting bandwidth and power resources.

SUMMARY

The systems and methods discussed herein enable a data processing system to automatically improve content selection processes by identifying which negative retrieval tokens of a set of negative retrieval tokens are having the greatest impact on the number of the content items selected for insertion into information resources using estimation techniques based on historical data. The data processing system can further identify other retrieval tokens provided by the content provider, which are associated with similar sets of information resources. After identifying which retrieval tokens have the greatest impact on the content selection process, the data processing system can remove those retrieval tokens from the provided retrieval tokens, and perform an estimation process to determine if there is an improvement in the number of information resources that can serve those content items. This may allow for reduction or elimination of erroneous content selections, allowing the data processing system to avoid communicating such content, and thereby reducing bandwidth and power consumption of the system.

At least one aspect of the present disclosure is directed to a method for pruning selection criteria from a set of selection criteria based on document space associations. The method can include receiving, by a data processing system including one or more processors from a content provider computing system, a plurality of retrieval tokens. Each of the plurality of retrieval tokens can include a second retrieval token. The method can include retrieving, by a data processing system, an indication of the first retrieval token. The first retrieval token can be included in the plurality of retrieval tokens. The method can include retrieving, by the data processing system, a plurality of predicted requests based on the plurality of retrieval tokens. The method can include constructing, by the data processing system, a first data structure indicating associated predicted requests for a first retrieval token of a plurality of retrieval tokens. Such data structure may comprise a bit string, with each position in the first bit string corresponding to a respective one of the plurality of predicted requests, and having a value indicating whether the respective predicted request corresponds to the first retrieval token. In some such implementations, the method can include retrieving, by the data processing system, a second bit string, the second bit string can be associated with the second retrieval token in the plurality of retrieval tokens. Each position in the second bit string can correspond to a respective one of the first plurality of predicted requests, and have a value indicating whether the respective predicted request corresponds to the second retrieval token. The method can include comparing, by the data processing system, the first data structure or bit string with the second data structure (e.g. indicating associated predicted requests for a second retrieval token of a plurality of retrieval tokens) or bit string to calculate a similarity value. The method can include determining, by the data processing system, whether the similarity value is greater than a predetermined threshold. The method can include removing, by the data processing system, the first retrieval token and the second retrieval token from the plurality of retrieval tokens to create a pruned plurality of retrieval tokens responsive to determining the similarity value is greater than a predetermined threshold. The method can include providing, by the data processing system, the pruned plurality of retrieval tokens to the content provider computing device.

In some implementations, the first data structure and second data structure each comprise bit strings, wherein each position in each bit string corresponds to a predicted request of a plurality of predicted requests, and has a value indicating whether the respective predicted request corresponds to the respective retrieval token. In some further implementations, the method can include selecting, using a bit string selection criteria, positions in the first bit string to create a first pruned bit string. The first pruned bit string may be smaller than the first bit string. In some implementations, the method can include selecting, using a bit string selection criteria, positions in the second bit string to create a second pruned bit string. The second pruned bit string may be smaller than the second bit string. In some implementations, comparing the first bit string to the second bit string includes comparing the first pruned bit string to the second pruned bit string.

In some implementations, the selection criteria to create the first pruned bit string is based on pseudo-random selection. In some implementations, retrieving the plurality of predicted requests further comprises retrieving a plurality of weight values. Each of the plurality of weight values can correspond to an estimated traffic value for the respective predicted request. In some implementations, the method can include comparing, by the data processing system, each of the plurality of weight values to a predetermined traffic threshold. In some implementations, the method can include selecting, by the data processing system, a pruned plurality of predicted requests. Each of the pruned plurality selected from the plurality of predicted requests responsive to the respective weight value being greater than the predetermined traffic threshold. In some implementations, the method can include constructing, by the data processing system, the first bit string. Each position in the first bit string can correspond to a respective one of the pruned plurality of predicted requests, and have a value indicating whether the respective pruned predicted request corresponds to the first retrieval token.

In some implementations, the method can include performing, by the data processing system, a logical AND operation between the first bit string and the second bit string to create a compared bit string. In some implementations, the method can include counting, by the data processing system, the number of positions in the compared bit string equal to a predetermined match value to calculate the similarity value. In some implementations, the method can include removing, by the data processing system, the first the first retrieval token from the plurality of retrieval tokens to create the pruned plurality of retrieval tokens responsive to the similarity value being less than the predetermined threshold. In some implementations, each of the plurality of retrieval tokens is associated with a content rating value. In some implementations, the method can include retrieving the plurality of predicted requests based on the plurality of retrieval tokens, and the content rating value associated with the first retrieval token. In some implementations, the method can include providing an indication of the first retrieval token and the second retrieval token. In some implementations, the method can include retrieving, by the data processing system, a relevance value for the pruned plurality of retrieval tokens based on the pruned plurality of retrieval tokens. In some implementations, the method can include providing, by the data processing system, a relevance value based on the pruned plurality of retrieval tokens to the content provider computing device.

At least one other aspect of the present disclosure is directed to a system comprising a data processing system comprising one or more processors. The data processing system can receive, from a content provider computing system, a plurality of retrieval tokens. The plurality of retrieval tokens including a second retrieval token. The data processing system can retrieve an indication of the first retrieval token, the first retrieval token included in the plurality of retrieval tokens. The data processing system can retrieve a plurality of predicted requests based on the plurality of retrieval tokens. The data processing system can construct a first data structure indicating associated predicted requests for a first retrieval token of a plurality of retrieval tokens. Such data structure may comprise a bit string, with each position in the first bit string corresponding to a respective one of the plurality of predicted requests, and having a value indicating whether the respective predicted request corresponds to the first retrieval token. In some such implementations, the data processing system can retrieve a second bit string, the second bit string associated with the second retrieval token in the plurality of retrieval tokens. Each position in the second bit string can correspond to a respective one of the first plurality of predicted requests, and has a value indicating whether the respective predicted request corresponds to the second retrieval token. The data processing system can compare the first data structure or bit string with the second data structure (e.g. indicating associated predicted requests for a second retrieval token of a plurality of retrieval tokens) or bit string to calculate a similarity value. The data processing system can determine the similarity value is greater than a predetermined threshold. The data processing system can remove the first retrieval token and the second retrieval token from the plurality of retrieval tokens to create a pruned plurality of retrieval tokens responsive to determining the similarity value is greater than a predetermined threshold. The data processing system can provide the pruned plurality of retrieval tokens to the content provider computing device.

In some implementations, the first data structure and second data structure each comprise bit strings, wherein each position in each bit string corresponds to a predicted request of a plurality of predicted requests, and has a value indicating whether the respective predicted request corresponds to the respective retrieval token. In some further implementations, the data processing system can select, using a bit string selection criteria, positions in the first bit string to create a first pruned bit string, the first pruned bit string smaller than the first bit string. In some implementations, the data processing system can select, using a bit string selection criteria, positions in the second bit string to create a second pruned bit string, the second pruned bit string smaller than the second bit string. In some implementations, the data processing system can compare the first bit string to the second bit string by comparing the first pruned bit string to the second pruned bit string. In some implementations, the bit string selection criteria to create the first pruned bit string is based on pseudo-random selection. In some implementations, the data processing system can retrieve a plurality of weight values, each of the plurality of weight values corresponding to an estimated traffic value for the respective predicted request. In some implementations, the data processing system can compare each of the plurality of weight values to a predetermined traffic threshold.

In some implementations, the data processing system can select a pruned plurality of predicted requests, each of the pruned plurality selected from the plurality of predicted requests responsive to the respective weight value being greater than the predetermined traffic threshold. In some implementations, the data processing system can construct the first bit string, wherein each position in the first bit string corresponds to a respective one of the pruned plurality of predicted requests, and has a value indicating whether the respective pruned predicted request corresponds to the first retrieval token. In some implementations, the data processing system can perform a logical AND operation between the first bit string and the second bit string to create a compared bit string. In some implementations, the data processing system can count the number of positions in the compared bit string equal to a predetermined match value to calculate the similarity value.

In some implementations, the data processing system can remove the first retrieval token from the plurality of retrieval tokens to create the pruned plurality of retrieval tokens responsive to the similarity value being less than the predetermined threshold. In some implementations, each of the plurality of retrieval tokens can be associated with a content rating value. In some implementations, the data processing system can retrieve the plurality of predicted requests based on the plurality of retrieval tokens, and the content rating value associated with the first retrieval token. In some implementations, the data processing system can provide an indication of the first retrieval token and the second retrieval token. In some implementations, the data processing system can retrieve a relevance value for the pruned plurality of retrieval tokens based on the pruned plurality of retrieval tokens. In some implementations, the data processing system can provide the relevance value to the content provider computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
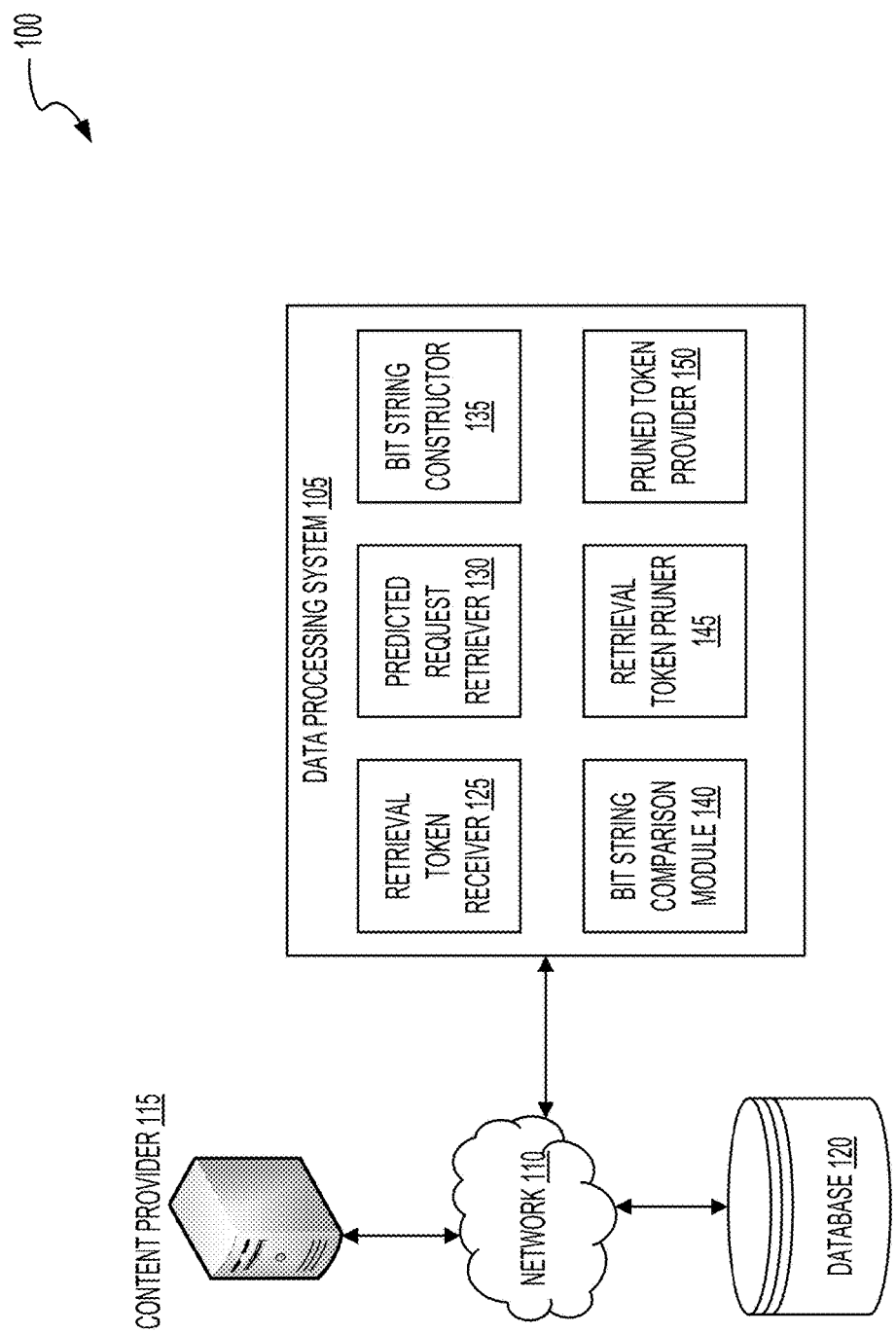
FIG. 1 shows a block diagram depicting an example system for pruning retrieval tokens for content provider platforms.

Below are detailed descriptions of various concepts related to, and implementations of, methods, apparatuses, and systems of privacy preserving determination of intersection of sets of user identifiers. The various concepts introduced above and discussed in greater detail below may be implemented in any of numerous ways, as the described concepts are not limited to any particular manner of implementation.

Content providers can provide content items to content selection systems for insertion into information resources, which may be web pages, video segments, or mobile applications, among others. The content selection systems can insert content items provided by a content provider into information resources based on the contents of an information resource. For example, if certain keywords are associated with the information resource, or if an information resource is viewed by groups of users associated with certain demographic information, content selection systems can select the content items that are associated with similar attributes. Accordingly, content provider systems can associate retrieval tokens with their content items, which can include targeting information that can direct a content selection system to insert the content items into targeted information resources. The retrieval tokens provided by the content provider can include language information, user demographic information, user interest vertical information, content rating information, and keywords information, among others.

The retrieval tokens can also include a quality, such as a positive or negative quality. A positive retrieval token can indicate to a content selection platform that the content item associated with the retrieval token should be inserted into information resources that have attributes that match those of the positive retrieval token. In contrast, negative retrieval tokens can indicate to the content selection platform that the associated content should not be inserted into information resource that have attributes that match those of the negative retrieval token. In this way, content providers can use lists of retrieval tokens, both positive and negative, to tune which information resources can include their content items. In addition, certain content selection platforms can provide interfaces to estimate the number and quality of information resources, which can include the content items provided by a content provider based on the retrieval tokens associated with those content items.

However, determining which combinations of retrieval tokens maximize the targetable information resources is a computationally difficult task, because it can include estimating the impact of each possible permutation of the retrieval tokens provided by the content provider. Many content providers provide lists of hundreds to thousands of retrieval tokens, making iterative estimation of each permutation nearly computationally infeasible. These issues are compounded by the fact that many content providers simply use prepared third-party lists of positive and negative retrieval tokens, which may have an unexpected and unintended negative effect on the number of information resources which can include the content items of the content provider. Furthermore, manual tuning of retrieval tokens based on estimated feedback by content providers can be impractically time consuming.

To address the foregoing technical problems, a data processing system can automatically identify which of the negative retrieval tokens are having the greatest impact on the number of the content items selected for insertion into information resources using estimation techniques based on historical data. The data processing system can further identify other retrieval tokens provided by the content provider which are associated with similar sets of information resources. After identifying which retrieval tokens are having the greatest impact on the content selection process, the data processing system can remove those retrieval tokens from the provided retrieval tokens, and perform an estimation process to determine if there is an improvement in the number of information resources that can serve those content items.

For example, consider an information resource with the title "Phone Unboxing Video," accompanied with a description reciting "Go to my channel to see my other videos." Accordingly, the information resource can be associated with the English language. Consider a content provider who wishes to target this information resource, and perhaps other similar information resources, with a content item. However, the content provider has unintentionally added the negative targeting criteria (e.g., negative retrieval tokens) of "video," "videos," and "TV," among others. Assume that the negative keyword "video" is having the greatest negative impact on the number of targetable information resources. In some implementations, the data processing system can determine that the keywords "videos," and "TV," should also be removed from the list of retrieval tokens provided by the content provider, because they are associated with similar historical requests from similar information resources. Therefore, the data processing system can eliminate the need to iteratively remove and perform a predicted request estimation for each combination negative keywords by instead removing all similar retrieval tokens based on similar historical patterns.

The technical solution described herein can thus significantly reduce the computational complexity of removing unnecessary or unintended retrieval tokens, which may negatively impact the reach of content items. Furthermore, by applying bit compression techniques based on statistical analysis, the data processing system can significantly reduce the storage requirements and computational complexity of determining similarly associated information resources for each retrieval token, which is an improvement over other implementations.

FIG. 1 depicts a system 100 for pruning retrieval tokens for content provider platforms. The system 100 can include at least one computer network 110. The system 100 can include at least one content provider 115. The system 100 can include at least one data processing system 105. The data processing system 105 can include at least one retrieval token receiver 125. The data processing system 105 can include at least one predicted request retriever 130. The data processing system 105 can include at least one bit string constructor 135. The data processing system 105 can include at least one bit string comparison module 140. The data processing system 105 can include at least one retrieval token pruner 145. The data processing system 105 can include at least one pruned token provider 150. The system 100 can include at least one database 120. In some implementations, the data processing system can include the content provider 115. In some implementations, the data processing system can include the database 120.

Figure 7:
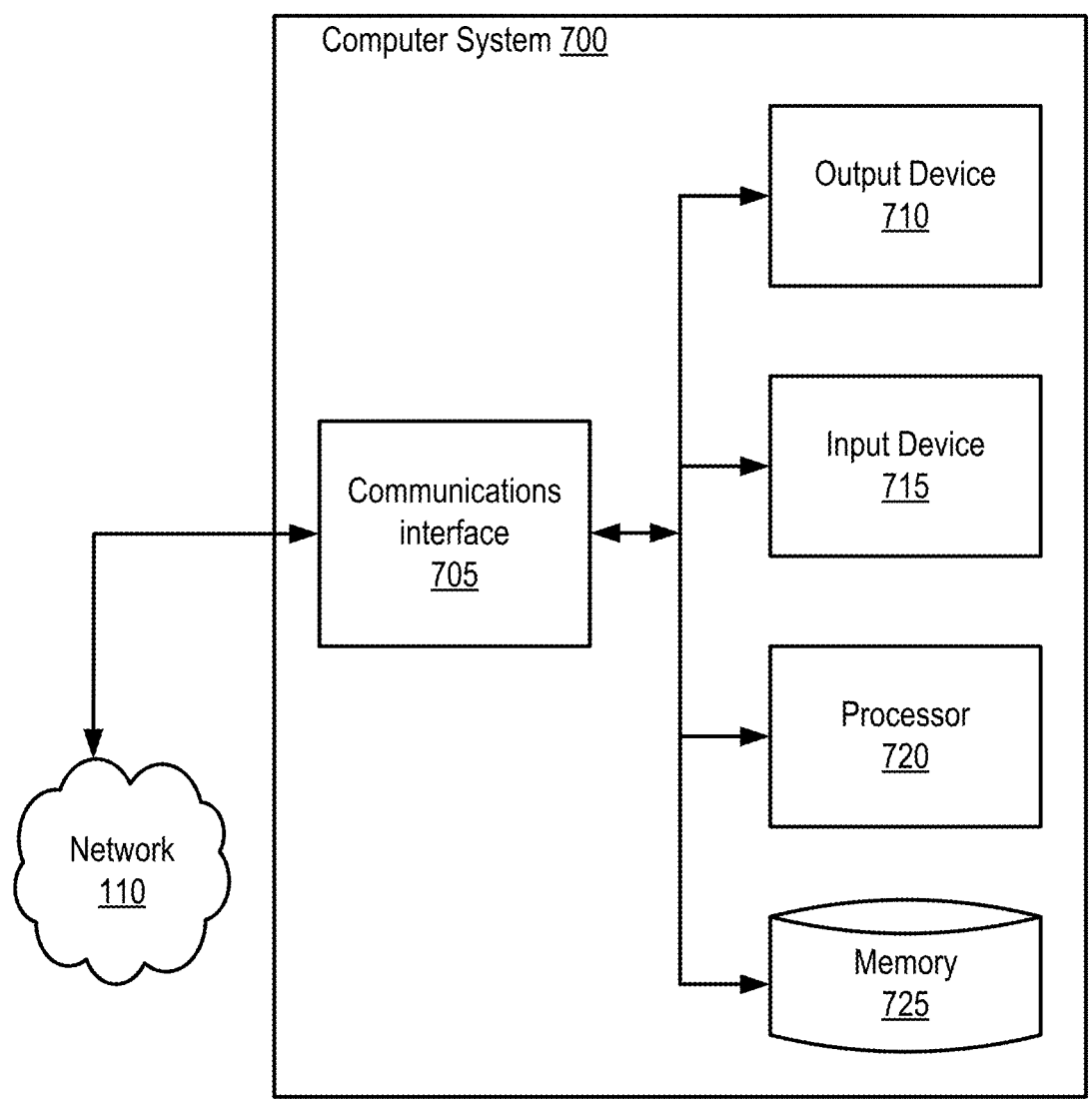
FIG. 7 shows the general architecture of an illustrative computer system that may be employed to implement any of the computers discussed herein.

Each of the components (e.g., the network 110, the content provider 115, the data processing system 105, the retrieval token receiver 125, the predicted request retriever 130, the bit string constructor 135, the bit string comparison module 140, the retrieval token pruner 145, the pruned token provider 150, the database 120) of the system 100 can be implemented using the hardware components or a combination of software with the hardware components of a computing system 700 detailed herein in conjunction with FIG. 7. For example, the data processing system 105 can include servers or other computing devices.

The content provider 115 can also include servers or other computing devices. Each of the components of the data processing system 105 can perform the functionalities detailed herein.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with at least one content provider 115 and at least one database 120. The network 110 may be any form of computer network that relays information between the content provider 115, data processing system 105, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network The network 110 may further include any number of hardwired and/or wireless connections. The content provider 115 may communicate wirelessly (e.g., via WiFi, cellular, radio, etc.) with a transceiver that is hardwired (e.g., via a fiber optic cable, a CAT5 cable, etc.) to other computing devices in the network 110. The content provider 115 may also communicate wirelessly with the computing devices of the network 110 via a proxy device (e.g., a router, network switch, or gateway).

The data processing system 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions.

The content provider 115 can include servers or other computing devices operated by a content provider entity to provide content items for display on information resources. The content provided by the content provider 115 can include third party content items for display on information resources, such as an information resource that includes primary content, e.g. content provided by the content provider 115. The content items can also be displayed on a search results web page. For instance, the content provider 115 can provide or be the source of content items for display in content slots of information resources, such as a web page of a company where the primary content of the web page is provided by the company, or for display on a search results landing page provided by a search engine.

The content items associated with the content provider 115 can be displayed on information resources other than web pages, such as content displayed as part of the execution of an application on a smartphone or other client device. The functionality of the content provider 115 in the context of system 100 will be explained below.

The database 120 can be a database configured to store and/or maintain any of the information described herein. The database 120 can be stored in any appropriate type and form of data structure, such as an array, flat file, delineated file, or any other type and form of database file. In some implementations, the database 120 can be pre-populated with predicted request values. The predicted request values can be generated by an external system based on historical data and associated retrieval tokens. The database 120 can maintain one or more data structures, which can contain and/or index each of the values, pluralities, or thresholds described herein. In some implementations, the database may be accessed using one or more memory addresses or index values. The database 120 may be accessed by the modules of the data processing system 105, or the content provider 115 via the network 110. In some implementations, the database 120 is internal to the data processing system 105. In some implementations, the database 120 may exist external to the data processing system 105, and may be accessed via the network 110. In some implementations, the database 120 may be distributed across many different computer systems or storage elements, and may be accessed via the network 110 and/or a suitable computer bus interface. The data processing system can store the results of any or all computations, determinations, selections, identifications, or calculations in one or more data structures indexed appropriate values, each of which may be accessed by the data processing system 105 or the content provider 115 to perform any of the functions described herein.

The retrieval token receiver 125 may comprise an application, server, service, daemon, routine, or other executable logic for receiving retrieval tokens from one or more content providers, and may be executed by a processor of the computing system or a co-processor or other hardware (e.g. ASIC or FPGA circuits, etc.). The retrieval token receiver 125 can receive a plurality of retrieval tokens from the content provider 115. In some implementations, the retrieval token receiver 125 can receive a request to prune retrieval tokens from the plurality of retrieval tokens. Pruning the plurality of retrieval tokens can improve the content selection process for a content provider 115 by increasing the number of interactions with the content items associated with the plurality of retrieval tokens. In addition, the retrieval tokens may be inserted into content items to increase the likelihood of their selection and insertion into information resources. If the retrieval token is somehow present in (e.g., a keyword on a web page, etc.) or directly related to (e.g., contains a similar language, or user demographic information, etc.) an information resource, the content item associated with the retrieval token may have a higher likelihood of being inserted into the information resource. Retrieval tokens may be associated with a particular quality, for example, a positive retrieval token or a negative retrieval token. Positive retrieval tokens may increase the likelihood of content item being inserted into related (e.g., matching keyword, similar user demographics, etc.) information resources. In contrast, retrieval tokens with a negative quality may have the opposite effect, and can decrease the likelihood that an associated content item will be inserted in a related (e.g., matching keyword, similar user demographics, etc.) information resource. Negative retrieval tokens may exclude a content item from one or more information resources.

The content provider 115 can specify which retrieval tokens are associated with a particular content item, and the contents and quality of each retrieval token in the plurality of retrieval tokens. Using the retrieval tokens, the content provider 115 can provide specific targeting criteria for content items. For example, the content provider 115 may specify that a content item should not be shown on an information resource containing certain keywords or phrases. In another example, a content provider 115 may provide retrieval tokens, which indicate that a content item should be shown on an information resource in another language, e.g., Spanish. In some implementations, multiple retrieval tokens can be used to specify multiple targeting criteria for a content item.

In some implementations, the retrieval tokens can be associated with one or more information resources and/or documents. The retrieval token can include one or more of: demographic information, content ratings, language, content subject matter, keywords, phrases, or other information related to information resources. For example, the retrieval token include demographic information. Information resources may have higher traffic from users associated with a particular demographic. Accordingly, those retrieval tokens can be associated with information resources, which are accessed by users with the same demographic information (e.g., based user profile information, etc.). In another example, an information resource can be associated with a particular content rating or subject matter. In such situations, retrieval tokens including an indication of similar content ratings and/or content subject matter may be associated with such information resources. In another example, information resources can include one or more keywords or phrases. If the one or more keywords or phrases are present in an information resource, the retrieval tokens may be associated with that information resource. Retrieval tokens can be used by content selection platforms to select content items related to the information resources where they may be inserted. Positive retrieval tokens allow a content provider to direct content items to information resources associated with particular keywords, demographics, and other information, while negative retrieval tokens allow a content provider to direct content items away from associated information resources. The data processing system 105 can access the information resources associated with retrieval tokens from the database 120.

The predicted request retriever 130 may comprise an application, server, service, daemon, routine, or other executable logic for retrieving request predictions. The predicted request retriever 130 may be combined with the retrieval token receiver 125 in some implementations. The predicted request retriever 130 can retrieve an indication of a first retrieval token. The first retrieval token can be included in the plurality of retrieval tokens received by the retrieval token receiver 125. The first retrieval token can be the token that has been determined to have the greatest negative impact on the number of information resources that can request the associated content item. For example, the first retrieval token can be a negative retrieval token including the keyword 'video,' which can prevent the associated content item from being displayed on any information resource including the keyword 'video.' In some implementations, the first retrieval token can be indicated by accessing a data structure in the database 120. In some implementations, the indication of the first retrieval token can be a request for the top negative retrieval token in the plurality of retrieval tokens. For example, the predicted request retriever 130 may retrieve information resource associations for each of the plurality of keywords. The predicted request retriever 130 can determine which of the plurality of retrieval tokens is both negative and associated with the most information resources, thereby retrieving the top negative retrieval token from the plurality of retrieval tokens. In some implementations, the predicted request retriever 130 can retrieve a plurality of top negative retrieval tokens, and communicate them to the content provider 115. The content provider 115 can make a selection of at least one of the provided plurality of negative retrieval tokens, and communicate the indication to the predicted request retriever 130.

The predicted request retriever 130 can retrieve a plurality of predicted requests from the database 120. In some implementations, the predicted request retriever 130 can retrieve the plurality of predicted requests based on each of the plurality of retrieval tokens. For example, the first retrieval token can correspond to a location in a database 120 where some or all of the plurality of predicted requests are stored. In some implementations, the predicted request retriever 130 can access the database 120 to retrieve the plurality of predicted requests without using the first retrieval token. The database 120 can be pre-populated with a list of predicted requests associated with each of the plurality of retrieval tokens. The predicted request retriever 130 can aggregate the predicted requests from each of the retrieval tokens to create a plurality of predicted requests. Each predicted request may include an indication that an information resource is predicted to request a content item associated with a particular retrieval token based on historical content item information in the database 120. For example, each retrieval token can be associated with a particular request for content to be inserted in an information resource. In some implementations, each of the predicted requests can include an associated content rating value. The content rating value can correspond to a rating of the associated information resource (e.g., G, PG, R, ESRB ratings, etc.). Based on historical data in the database 120, the predicted request retriever 130 can retrieve whether an information resource is expected to request content associated with each of the plurality of retrieval tokens. The predicted request retriever 130 can retrieve the number of predicted requests for a retrieval token, and each of the information resources associated with the requests. For example, based on past performance data stored in the database 120, data structures can be created, which indicate which information resources requested content associated with each of the plurality of retrieval tokens. The past historical data can be extrapolated based on seasonality data and other content item information to determine predicted request values and predicted request information resources (e.g., how many information resources may request content associated with a retrieval token, etc.) for each of the plurality of retrieval tokens.

The bit string constructor 135 may comprise an application, server, service, daemon, routine, or other executable logic for constructing bit strings for each of the plurality of requests associated with each of the plurality of retrieval tokens. In some implementations, the bit string constructor 135 may comprise a hardware counter circuit for incrementing bit values of a string in a memory device. The bit strings can represent a document space for each of the predicted requests associated with the plurality of retrieval tokens. Each of the predicted requests can be associated with an information resource. The bit string constructor 135 can operate on each of the plurality of retrieval tokens received by the retrieval token receiver 125. In some implementations, the bit string constructor 135 can construct bitmaps for each of the plurality of retrieval tokens sequentially (e.g., one at a time). In some implementations the bit string constructor 135 can construct bit strings for each of the plurality of retrieval tokens in parallel (e.g., some or all bit strings constructed at the same time, etc). To construct a bit string for a retrieval token, the bit string constructor 135 can allocate a region of memory to store the bit string. In some implementations, the region of memory can be previously allocated by another component of the data processing system 105.

For each bit in the bit string for the retrieval token, the bit string constructor 135 can assign an index, which corresponds to a respective one of the plurality of predicted requests. The bit string constructor 135 can access the database 120 to retrieve a set of associations between the respective retrieval token and the plurality of predicted requests retrieved by the predicted request retriever 130. Each of the plurality of predicted requests can include an index value, which corresponds to a position in the bit string for that retrieval token.

The bit string constructor 135 can analyze each of the associations accessed from the database 120 to determine whether each of the predicted requests is associated with the retrieval token. If the predicted request corresponds to the predicted request, the bit string constructor 135 can set the bit position in the bit string, which corresponds to the index value of the predicted request to a match value. In some implementations, the match value can be a binary number (e.g., a zero or a one). For example, if the predicted request corresponds to the retrieval token, the match value can be set as '1.' If the predicted request is not associated with the retrieval token, the bit string constructor 135 can set the position in the bit string corresponding to the index value of the predicted request to a non-match value. In some implementations, the non-match value can be a binary number (e.g., a zero or a one). For example, if the predicted request does not correspond to the retrieval token, the bit string constructor 135 can set the appropriate bit string position to a '0.' In some implementations, a binary '0' can be the match value, and a binary '1' can be the non-match value.

Figure 2:
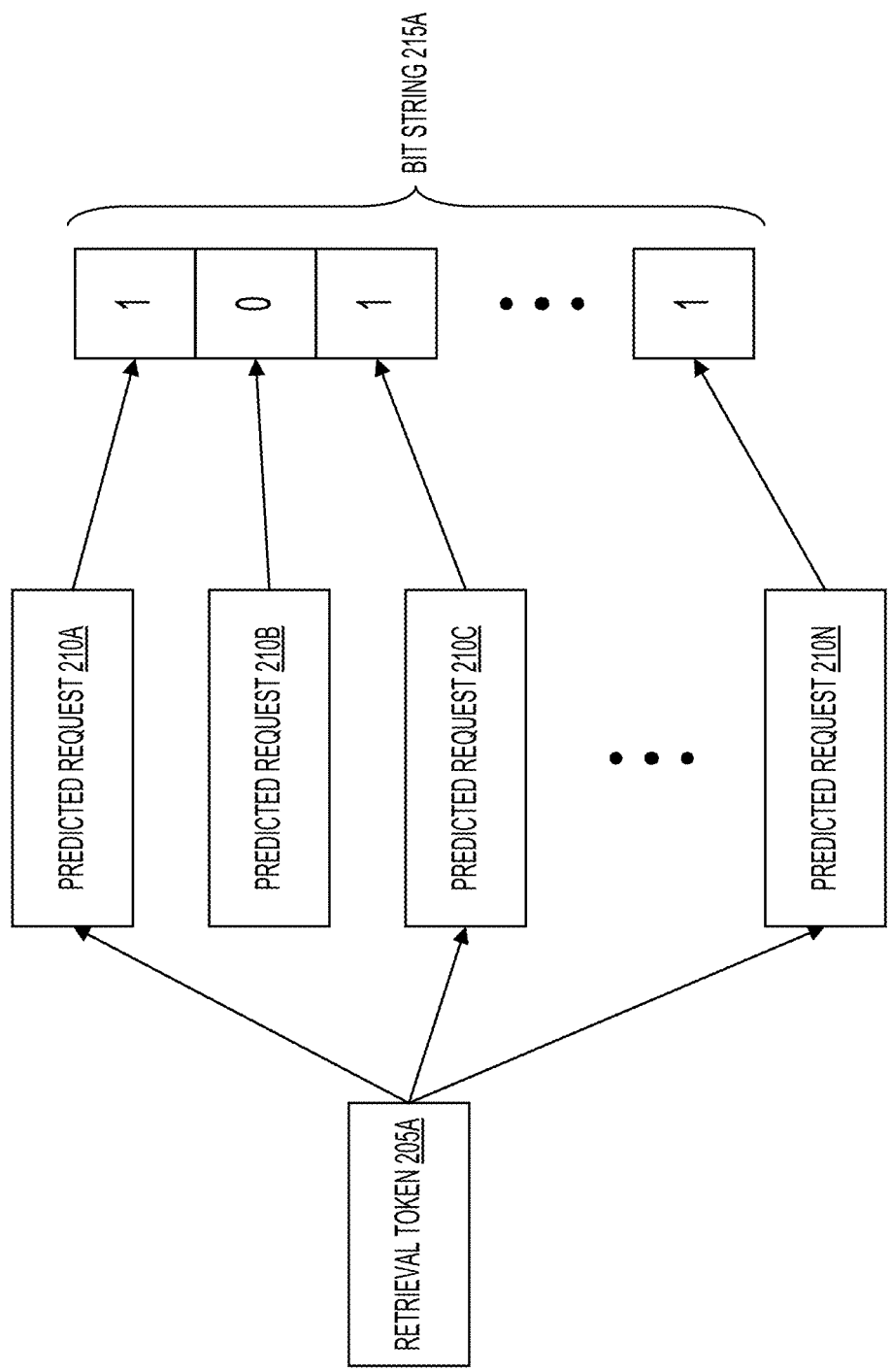
FIG. 2 shows an illustrative diagram of constructing a bit string for a retrieval token based on predicted requests.

To visualize the process of constructing a bit string for a retrieval token, we refer now to FIG. 2. Depicted is an example illustration to aid in understanding how each predicted request 210A-N can be used to populate the bit string 215A based on associations to a retrieval token 205A. As illustrated, the retrieval token 205A has an association to the predicted request 210A, the predicted request 210C, and the predicted request 210N. The dots are added to illustrate that any number of predicted requests can be used to construct a bit string of any size. Note that the retrieval token 205A is not associated with the predicted request 210B (or is negatively associated with the predicted request). Based on each of the associations and non-associations, each position of the bit string is populated to correspond to a particular predicted request. For example, the positions in the bit string that correspond to predicted request 210A, predicted request 210C, and predicted request 210N are all set to '1,' which in this example is the match value. Because the predicted request 210B is not associated with the retrieval token 205A, its corresponding position in the bit string 215A is set to a non-match value, which in this example is a binary '0.' Although illustrated here is only one example of the translation from associations into a bit string of a single retrieval token, it should be understood that the bit string constructor 135 can construct bit strings for each of the plurality of predicted requests retrieved by the predicted request retriever 130. In many implementations, the constructed bit string may be substantially sparse (e.g., having a ratio of 0's to 1's in excess of 2:1, 5:1, 10:1, 100:1, or any other such value; and/or having positive data indicators (e.g., 1's) on average widely separated by a plurality of negative data indicators (e.g., 0's) within the bit string). For example, in some implementations, the bit string may have thousands or tens of thousands of positions, and only a hundred or fewer positive values, scattered throughout the bit string. Such bit strings may be very difficult to process iteratively, due to the sparse nature of the data resulting in exhaustive and inefficient brute force processes.

Referring back to FIG. 1, it should be understood that the bit string constructor 135 can create bit strings with formats alternative to a binary bit string. For example, in some implementations, each of the predicted requests retrieved by the predicted request retriever 130 can include a respective weight value. The weight value can correspond to how closely associated the predicted request is to a respective retrieval token. In some implementations, the bit sting constructor can populate each position of the bit string with the weight value corresponding to respective predicted request for the retrieval token. In some implementations, the weight value can correspond to an estimated traffic value for the corresponding predicted request.

In some implementations, the bit string constructor 135 can construct a bit string by applying a threshold to the weight values associated with each of the predicted requests to create a pruned plurality of predicted requests. The pruned plurality of predicted requests can be used to construct a bit string as described herein above. For example, certain predicted requests may indicate high levels of traffic (e.g., the predicted request may originate from a web-page with many users). A predicted request indicating high levels of traffic may be more relevant for a content provider 115 than a predicted request indicating low levels of traffic. Accordingly, the bit string constructor can remove certain predicted requests with an estimated traffic weight value that is less than a predetermined traffic threshold. In some implementations, the bit string constructor 135 can access the database 120 to retrieve a predetermined traffic threshold. In some implementations, the bit string constructor 135 can receive the predetermined traffic threshold from the content provider 115.

The bit string constructor 135 can compare each of the estimated traffic values included in each of the plurality of predicted requests to the predetermined traffic threshold to determine whether to remove the predicted request from the plurality of predicted requests. In some implementations, if the estimated traffic value included in a predicted request is less than the predetermined traffic threshold, it may be removed from the plurality of predicted requests. If the estimated traffic value included in a predicted request is greater than or equal to the predetermined traffic threshold, it may be included in the plurality of predicted requests. The bit string constructor 135 can iteratively compare the estimated traffic values included in each of the plurality of predicted requests to the predetermined traffic threshold to create a pruned plurality of predicted requests.

To improve the computational performance of the system, the bit string constructor 135 can perform a compression operation on the bit string to reduce storage footprint and reduce the amount of computations required by other modules of the data processing system 105, which use the bit strings in further operations. To compress a bit string, the bit string constructor 135 can select certain bits of each bit string based on a selection criteria, and use each of the selected bits to construct a pruned bit string which corresponds to the retrieval token associated with the bit string. For example, the bit string constructor 135 may select a particular range of positions in each bit string (e.g., the first one-hundred positions of each bit string) to create a respective pruned bit string. The pruned bit string can have fewer positions than the full bit string. In some implementations, the selection criteria can be retrieved from the database 120, or received from the content provider 115. In some implementations, the bit string constructor 135 can use pseudo-random selection as a selection criteria. The bit string constructor 135 can use the same selection criteria (e.g., the same pseudo-randomly selected positions) for each of the bit strings corresponding to each of the retrieval tokens received by the retrieval token receiver 125.

In this way, each of the pruned bit strings can be compared as described herein below in the same manner, as the positions in each pruned bit string correspond to the same set of predicted requests.

In some implementations, the bit string constructor 135 can create a pruned bit string by constructing a bloom filter for each of the retrieval tokens or for a combination of retrieval tokens. For example, the bit string constructor 135 can allocate a region of memory to store a bit string that corresponds to the retrieval token. Based the predicted requests associated with the retrieval token retrieved by the predicted request retriever 130, the bit string comparison module can use one or more hashing algorithms (e.g., SHA-1, SHA-2, MD5, etc.), each of which can map a predicted request to a position in the bit string. The bit string constructor 135 can hash each predicted request associated with the retrieval token using each of the hashing algorithms to create a group of bit position value. The bit string constructor 135 can set each of the positions in the bit string, which correspond to each of the group of bit position values to a match value (e.g., binary '1'). In some implementations, the number of bit string positions in the allocated bit string can be smaller than the total number of predicted requests for all of the retrieval tokens, thus decreasing the memory footprint of the bit string for each retrieval token. In some implementations, the bit string constructor 135 can construct the bit string using hashing algorithms such that if similar predicted requests are used to generate the bloom filter, the resulting bit strings will have similar bit positions set to a match value.

In some implementations, the bit string constructor 135 can create a pruned bit string using by using a count min-sketch algorithm to generate a vector of integer values for each retrieval token. The pruned bit string can include a vector of integer values, where each position of the vector can be a probabilistic count of a hash value. To create pruned bit string, the bit string constructor 135 can allocate a region of memory for a vector, which is initialized to zero. In some implementations, the number of positions in the vector can be less than the total number of predicted requests for all of the retrieval tokens. The bit string constructor 135 can hash each of the predicted requests for a retrieval token to generate a set of hashed predicted requests. Upon generating the hashed predicted requests, the bit string constructor 135 can increment each position in the pruned bit string vector, which corresponds to a respective hashed predicted request. For example, if the hashed predicted request is equal to three, the bit string constructor can increment the third position of the vector by one. In some implementations, the bit string constructor 135 can create multiple vectors for a retrieval token, with each vector corresponding to a hash function. In the case of multiple vectors, the bit string constructor 135 can increment each position of each vector which corresponds to the hashed predicted request, where a hashed predicted request is calculated using the respective hash function for that vector.

The bit string constructor 135 can store the constructed bit string for each of the plurality of retrieval tokens in the database 120. In some implementations, the bit string constructor 135 can store each bit string in a data structure indexed by an identifier of the corresponding retrieval token. In some implementations, the stored bit strings may be accessed by other modules of the data processing system 105, for example the bit string comparison module 140. In some implementations, the bit strings constructed by the bit string constructor 135 may be stored in computer memory, for example the memory 725 of computer system 700 described herein below in conjunction with FIG. 7. In some implementations, the bit string comparison module 140 can access the database 120 to retrieve one or more bit strings for further computations. In some implementations, the bit string constructor 135 can store the pruned bit string in place of the full bit string, which can reduce the storage requirements of the system without reducing the accuracy of the computations described herein.

The bit string comparison module 140 can retrieve each of the bit strings stored in computer memory (e.g., the database 120) for comparison with the bit string associated with the first retrieval token of the plurality of retrieval tokens. As described herein above, the first retrieval token can be the top negative retrieval token. In some implementations, the bit string comparison module 140 can receive an indication of one or more indicated retrieval tokens. For example, the bit string comparison module 140 can receive the indication from the content provider 115, from the database 120, from another module of the data processing system 105, or from another external computing device. Based on the indication, bit string comparison module 140 can access the database 120 to retrieve the bit strings associated with the indication. Allowing the bit string comparison module 140 to retrieve indicated bit strings can provide a computational improvement while only analyzing relevant retrieval tokens. In some implementations, the bit string constructor 135 can store the retrieved bit strings in a local memory computer memory, for example memory 725 described herein in conjunction with FIG. 7. In some implementations, the bit string comparison module 140 can retrieve bit strings from the bit string constructor 135.

To determine which of the plurality of retrieval tokens are closely related to the first retrieval token (e.g., are associated with similar predicted requests), the bit string comparison module 140 can compare each of the retrieved bit strings to the bit string corresponding to the first retrieval token (e.g., the top negative retrieval token, etc.), referred to generally as the first bit string. In some implementations, the bit string comparison module 140 can iteratively compare each of the retrieved bit strings with the first bit string, to determine a similarity value for each of the retrieved bit strings. The similarity value can be representative of the number of predicted requests each of the retrieved bit strings have in common with the first bit string. The similarity value may be a decimal value between 0 and 1, for example two bit strings which share similar predicted requests may have a similarity value that is close to or equal to 1, and two bit strings which do not share similar predicted requests may have a similarity value that is close to or equal to 0. In some implementations, the similarity value may be an integer value which corresponds to the number of predicted requests shared by two bit strings. In some implementations, the bit string comparison module 140 can determine a similarity value for groups of more than two bit strings.

Calculating the similarity value can be based on one or more logical operations or computations. For example, the bit string comparison module 140 may operate on two bit strings using a logical AND operation to determine which predicted requests are shared between the two bit strings. Performing a logical AND operation of the two bit strings can mask out the bits which are not common to both strings. Because each position of a bit string can correspond to a predicted request, a match-value remaining in the resulting AND'd bit string can indicate that the predicted request is associated with the retrieval tokens corresponding to the compared bit strings. In some implementations, the bit string comparison module can perform logical bitwise operations on more than two bit strings to calculate a shared similarity value. The bit string comparison module 140 can calculate a result bit string from a bitwise logical operation between two or more bit strings. Each position in the result bit string can indicate a corresponding predicted request is shared between two or more retrieval tokens. To determine the number of predicted requests shared between the two or more bit strings, the bit string comparison module 140 can count the total number of match-values in the result bit string. The bit string comparison module 140 can iteratively compare each position in the result bitmap, and increment a counter register each time the position in the result bit string is equal to the match value. Once the bit string comparison module has iterated over each position in the result bit string, the value of the counter register can be equal to the total number of shared predicted requests between the retrieval tokens used to calculate the result bit string.

Figure 3:
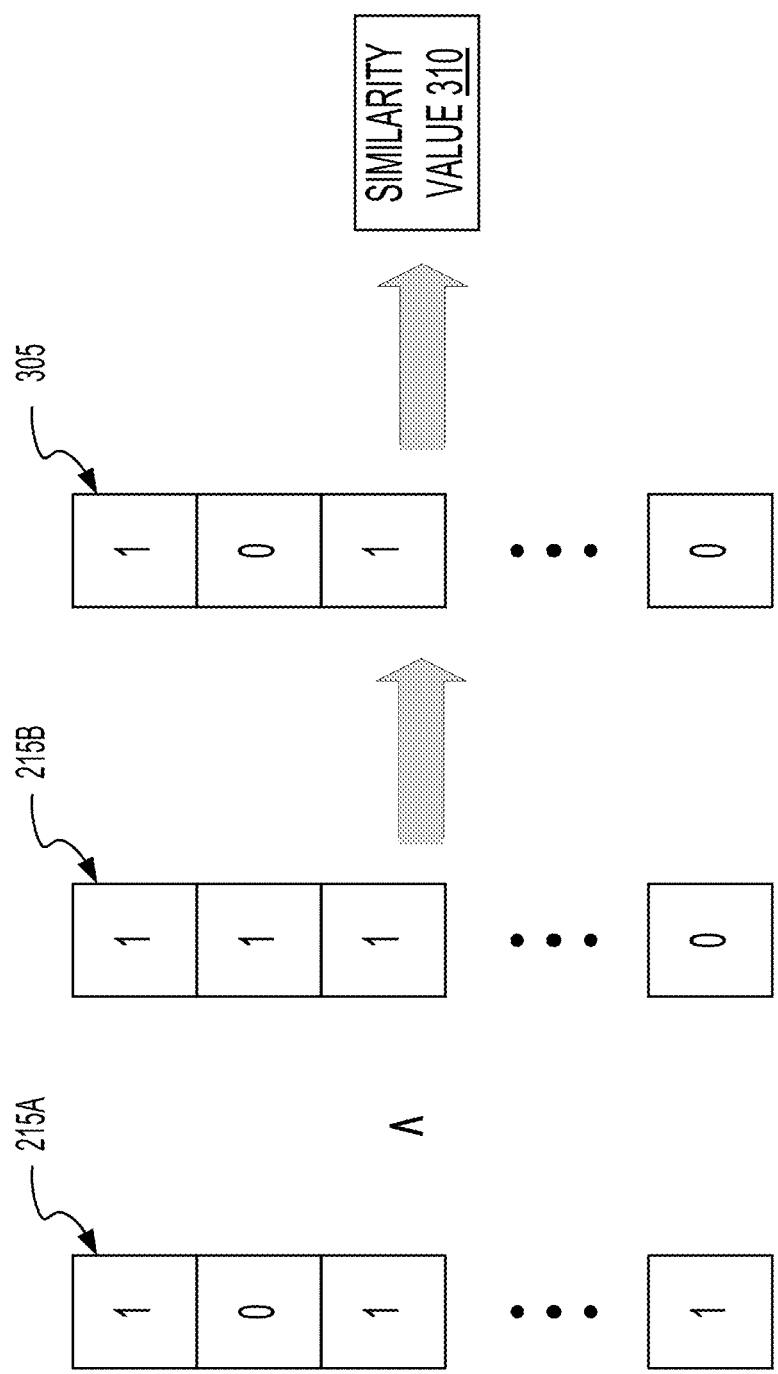
FIG. 3 shows an illustrative diagram of determining a similarity value from two bit strings.

To visualize at least some of the processes performed by the bit string comparison module 140, refer now to FIG. 3. Illustrated in FIG. 3 is a first bit string 215A and a second bit string 215B. Each of the first and second bit strings correspond to a first and second retrieval token, respectively. In this example illustration, the match value is equal to a binary one. Accordingly, each position in each bit string with a value of binary '1' indicates that a corresponding predicted request is associated with its respective retrieval token (e.g., an information resource which is likely to request content associated with that retrieval token, etc.). Because the match value is a binary '1' and the non-match value is a binary '0,' the bit string comparison module 140 can perform a bitwise logical AND between the first bit string 215A and the second bit string 215B to determine the result bit string 305. As illustrated, performing a bitwise logical AND operation can preserve only the bits that correspond to predicted requests that are shared between the first bit string 215A and the second bit string 215B. After calculating the result bit string 305, the bit string comparison module 140 can determine the similarity value 310. In some implementations, the bit string comparison module can iteratively determine the number of positions in the result bit string 305 that are equal to the match value. The total number of positions in the result bit string 305 can be equal to the similarity value 310. In some implementations, the bit string comparison module can divide the number of match positions by the total number of positions in the result bit string 305.

Referring back to FIG. 1, the bit string comparison module 140 can use other methods to determine the similarity value between two bit strings. In some implementations, each position in a first bit string and a second bit string may be equal to a weight value, which can correspond to a relevance value between the corresponding retrieval token and the predicted request corresponding to the respective position in the bit string. In this case, the bit string could be a vector of weight values, which may be integer values or floating point values. To determine a similarity value between two such bit strings, the bit string comparison module 140 can determine whether the relevance values in each position of the first bit string are equal to each respective position of the second bit string within a tolerance value (e.g., 10%, 15%, etc.). In some implementations, the tolerance value may be retrieved from the database 120, received from the content provider 115, received from another module of the data processing system 105, or received from another external computing device via network 110. If the two values are equal within the predetermined tolerance value, the bit string comparison module can set the corresponding position of a result bit string (e.g., result bit string 305) to a match value. The bit string comparison module 140 can iteratively compare each of the positions in the first and the second bit strings to determine the full result bit string. The bit string comparison module 140 can then iteratively count the number of match values present in the result bit string to determine the similarity value as described herein above to determine the similarity value. The bit string comparison module 140 can associate the similarity value with at least one of the first or the second bit strings. In some implementations, the bit string comparison module 140 can store the similarity value in a data structure, for example in the database 120 or another computer memory (e.g., memory 725 described herein below in conjunction with FIG. 7), with at least one of the first bit string, the second bit string, the first retrieval token, or the second retrieval token.

The retrieval token pruner 145 can compare each of the similarity values calculated by the bit string comparison module 140 to a predetermined similarity threshold to determine whether the corresponding retrieval token should be removed from the plurality of retrieval tokens. In some implementations, the retrieval token pruner 145 can retrieve the predetermined similarity threshold by accessing the database 120. In some implementations, the retrieval token pruner 145 can receive the predetermined similarity threshold from the content provider 115. The retrieval token pruner 145 can iteratively compare each of the similarity values calculated by the bit string comparison module 140 associated with each of the retrieval tokens received by the retrieval token receiver 125 to determine a prune value.

The prune value may be a Boolean register value, and may take the value of a binary '0' or a binary '1.' In some implementations, the retrieval token pruner 145 can determine whether the similarity value for a respective retrieval token is greater than the predetermined similarity threshold. If the similarity value is greater than the predetermined threshold, the retrieval token pruner 145 can associate a prune value (e.g., a binary value of of '1') with the respective retrieval token. For example, the retrieval token pruner 145 can store the prune value in a data structure (e.g., in the database 120 or computer memory 725 described herein below in conjunction with FIG. 7) which includes the corresponding retrieval token or an identifier of the retrieval token. If the similarity value is less than the predetermined similarity threshold, the retrieval token pruner 145 can associate a non-prune value (e.g., a binary value of '0,' etc.) with the respective retrieval token by storing the non-prune value in a data structure (e.g., in the database 120 or computer memory 725 described herein below in conjunction with FIG. 7) which includes the corresponding retrieval token or an identifier of the corresponding retrieval token. In some implementations, the retrieval token pruner 145 can automatically associated the first retrieval token (e.g., the top negative retrieval token) with a prune value of '1.'

Based on the prune value, the retrieval token pruner 145 can remove each of the designated retrieval tokens from the plurality of retrieval tokens. In some implementations, the retrieval token pruner 145 can remove the first retrieval token (e.g., the top negative retrieval token) from the plurality of retrieval tokens even if none of the plurality of retrieval tokens are associated with a prune value. The retrieval token pruner can access the data structures containing the prune values or the non-prune values and the corresponding retrieval tokens or the identifiers of the corresponding retrieval tokens. If the data structure includes a prune value, the retrieval token pruner can remove the corresponding retrieval token from a data structure including each of the plurality of retrieval tokens, thereby creating a data structure of pruned retrieval tokens. In some implementations, the retrieval token pruner 145 can create a data structure to contain the pruned retrieval tokens. The retrieval token pruner 145 can iteratively determine whether each retrieval token is associated with a non-prune value. If the retrieval token is associated with a non-prune value, the retrieval token pruner 145 can add the corresponding retrieval token to the data structure created to contain the pruned retrieval tokens. If the retrieval token is instead associated with a prune value, the retrieval token pruner 145 can ignore the corresponding retrieval token and not add it to the data structure created to contain the pruned retrieval tokens. In some implementations, the retrieval token pruner 145 can create a list of values indicating which retrieval tokens are not present in the data structure of pruned retrieval tokens to maintain a record of which retrieval tokens were removed from the plurality of retrieval tokens.

The pruned token provider 150 can provide the data structure including the pruned plurality of retrieval tokens to the content provider 115 via the network 110. In some implementations, the pruned token provider 150 can access the database 120 to retrieve a relevance value for each of the pruned plurality of retrieval tokens. In some implementations, the relevance value can be the sum of the estimated traffic values for each of the predicted requests associated with a corresponding retrieval token. In some implementations, the pruned token provider 150 can store the data structure including the pruned plurality of retrieval tokens in the database 120, indexed by a value corresponding to the request received by the retrieval token receiver 125 from the content provider 115. The content provider 115 can request data structures containing the pruned retrieval tokens from the pruned token provider 150. In response to the request the pruned token provider 150 can access the database 120 and communicate the requested data structure to the content provider 115 via the network. In some implementations, the pruned token provider 150 can communicate the data structure including the pruned retrieval tokens to the content provider 115 when the data structure including the pruned retrieval tokens is created (e.g., after creation and population by the retrieval token pruner 145). In addition to providing the pruned retrieval tokens, the pruned token provider 150 can provide an indication of each of the retrieval tokens that were removed from the plurality of retrieval tokens received by the retrieval token receiver 125.

Figure 4:
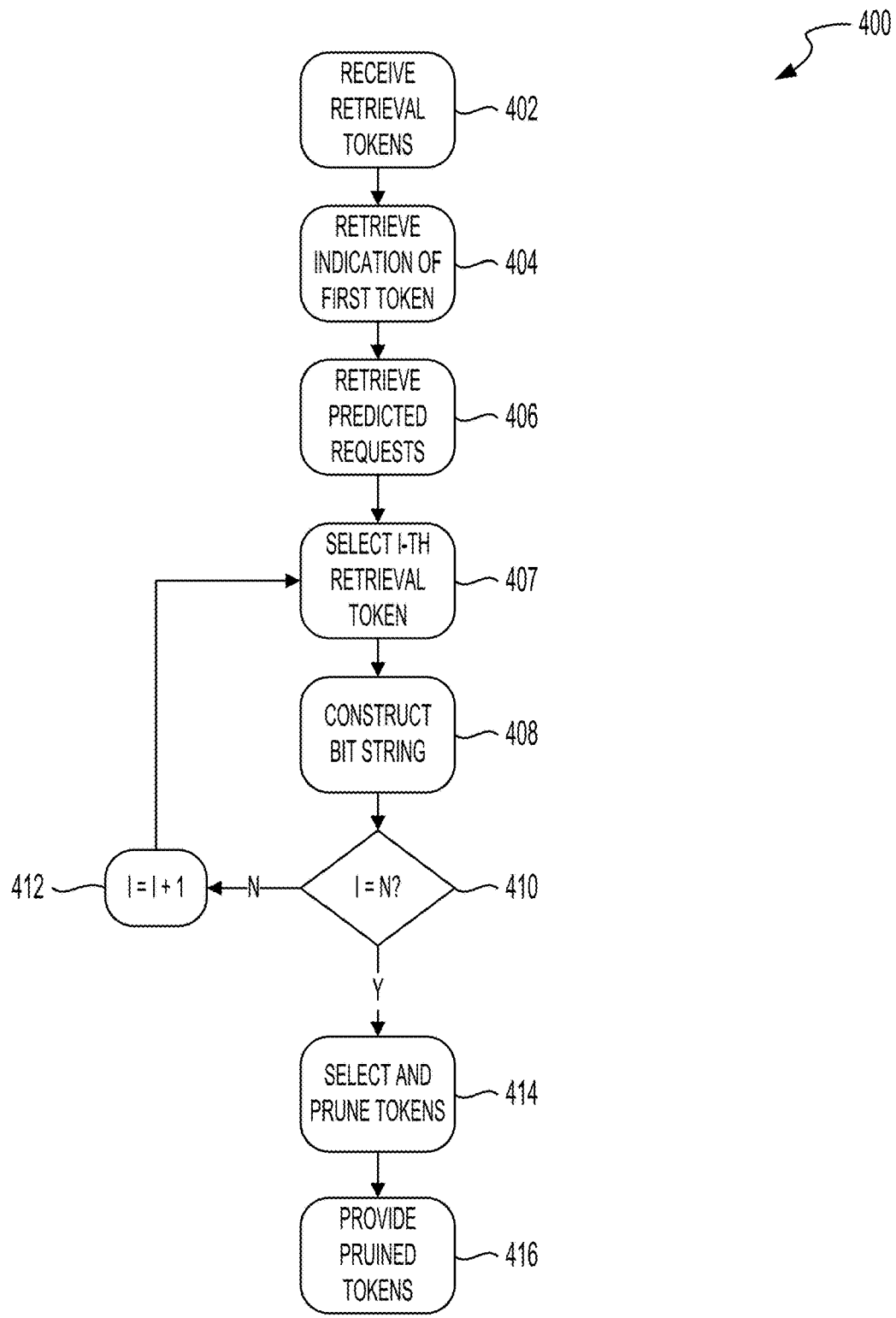
FIG. 4 shows a flow diagram of a method of pruning retrieval tokens from a set of retrieval tokens based on predicted requests.

Referring now to FIG. 4, illustrated is a flow chart of an example method 400 of pruning retrieval tokens from a set of retrieval tokens based on selection criteria. The method 400 can be performed or otherwise executed by the data processing system 105, the computer system 700 described herein in conjunction with FIG. 7, or any other computing devices described herein. The data processing system can receive a plurality of retrieval tokens (402). The data processing system can retrieve an indication of a first retrieval token (404). The data processing system can retrieve a plurality of predicted request (406). The data processing system can select the i-th retrieval token (407). The data processing system can construct a bit string corresponding to the i-th retrieval token (408). The data processing system can determine whether the counter register is equal to the number of retrieval tokens n (410). The data processing system can increment the counter register i (412). The data processing system can select and prune retrieval tokens from the plurality of retrieval tokens (416). The data processing system can provide the pruned retrieval tokens (416).

The data processing system (e.g., the data processing system 105) can receive a plurality of retrieval tokens (402). In some implementations, the data processing system can receive the plurality of retrieval tokens from a content provider (e.g., content provider 115) via a network (e.g., network 110). A retrieval token can include one or more of: demographic information, content ratings, content subject matter, keywords, phrases, or other information related to information resources. Receiving the plurality of retrieval tokens may include a request to remove retrieval tokens which are associated with predicted requests that may impact the performance of content items provided by the content provider. In some implementations, receiving the plurality of retrieval tokens can include receiving the total number of retrieval tokens n. In some implementations, the data processing system can determine the total number of retrieval tokens n after receiving the plurality of retrieval tokens. In some implementations, the data processing system can retrieve the plurality of retrieval tokens from a computer memory (e.g., database 120, memory 725 described herein below in conjunction with FIG. 7, etc.). The data processing system may also receive additional configuration information from the content provider along with the plurality of retrieval tokens, such as content rating information for each retrieval token, estimated traffic threshold values, similarity threshold values, among other values described herein.

The data processing system can retrieve an indication of a first retrieval token in the plurality of retrieval tokens (404). The indication may include information about the retrieval token, such as an identifier or other data which can allow the data processing system to access the first retrieval token from the plurality of retrieval tokens. For example, the plurality of retrieval tokens may be stored in a data structure in computer memory (e.g., the database 120 or memory 725 described herein below in conjunction with FIG. 7, etc.). The indication may be an index value which allows the data processing system to access a position in the data structure which includes the first retrieval token. In some implementations, the indication may include retrieval token quality information. For example, the first retrieval token may be the top negative retrieval token, meaning that it is negatively associated with the greatest number of predicted requests as described herein above. In some implementations, the indication can be received from a content provider computing device, or from another external computing device via a network (e.g., network 110). In some implementations, retrieving the indication can include retrieving the indication of more than retrieval token. In such implementations, each step of method 400 as described herein can be performed using each of the indicated retrieval tokens.

The data processing system can retrieve a plurality of predicted request (406). Each of the retrieval tokens received from the content provider can be associated with one or more predicted requests. A predicted request can be based on historical data retrieved from computer memory which can indicate that an information resource has requested content associated with a corresponding retrieval token. Each predicted request may be based on seasonality data (e.g., time periods, demographic information, etc.). In some implementations, a predicted request can be based on an information resource, for example if the information resource contains one or more keywords or phrases, related images, related videos, or related metadata, among others. An information resource containing information included in retrieval token may indicate that the information resource can request content associated with that retrieval token, making it a candidate for a predicted request based on other factors. In some implementations, a predicted request may be based on demographic information, for example if an information resource receives regular (e.g., based on historical data) views from users which are associated with demographic information included in a retrieval token.

The data processing system can select the i-th retrieval token (407). In order to determine retrieval tokens of the plurality of retrieval tokens will be removed, a bit string can be constructed for each of the retrieval tokens. The bit string can represent each of the plurality of predicted requests are associated with the retrieval token, and which of the plurality of predicted request are not associated with the retrieval token. In some implementations, the data processing system can iteratively loop through each of the retrieval tokens based on a counter register i. Each of the retrieval tokens may be indexed in a data structure by an index value (e.g., index 0, index 1, index 2, etc.). To process a retrieval token, the data processing system can select the retrieval token which includes an index value which is equal to the counter register i. If it is the first iteration of the loop, the counter register i may be initialized to an initialization value (e.g. i=0) before selecting the i-th retrieval token. Selecting the retrieval token can include copying the data associated with the retrieval token to a different region of computer memory, for example a working region of memory.

The data processing system can construct a bit string corresponding to the i-th retrieval token (408). Constructing a bit string can include executing the operations of method 408 described herein below in conjunction with FIG. 5. In some implementations, the data processing system can retrieve the bit string from computer memory (e.g., the database 120, memory 725 described herein below in conjunction with FIG. 7, etc.). In some implementations, the data processing system can receive the bit string from the content provider or another external computing device via network 110.

The data processing system can determine whether the counter register is equal to the number of retrieval tokens n (410). To determine whether the data processing system has generated a bit string for each of the retrieval tokens received from the content provider, the data processing system can compare the counter register used to select each retrieval token to the total number of retrieval tokens n. If the counter register i is not equal to (e.g., less than) the total number of retrieval tokens n, the data processing system can execute step (412). If the counter register i is equal to (e.g., equal to or greater than) the total number of retrieval tokens n, the data processing system can execute step (414).

The data processing system can increment the counter register i (412). In some implementations, the data processing system can add one to the register i to indicate the next unprocessed retrieval token in the plurality of retrieval tokens. In some implementations, the data processing system can set the counter register i to a memory address value (e.g., location in computer memory) of the next unprocessed retrieval token. In some implementations, the memory address value of the next unprocessed retrieval token can be included in the data structure at the location of the current (e.g., selected) retrieval token. After incrementing the value of the counter register i, the data processing system can execute step (407) of the method 400.

The data processing system can select and prune retrieval tokens from the plurality of retrieval tokens (416). Selecting and pruning tokens from the plurality of retrieval tokens can include executing the operations of method 414 described herein below in conjunction with FIG. 6. In some implementations, the data processing system can receive an indication of each retrieval token to be selected and pruned from the plurality of retrieval tokens. In some implementations, the data processing system can receive the indication to select and remove retrieval tokens by accessing a database or computer memory (e.g., database 120 or memory 725 described herein in conjunction with FIG. 7) and retrieving the indications from a data structure. In some implementations, the data processing system can receive the indication to select and prune retrieval tokens from the content provider or another external computing device via network (e.g., network 110).

The data processing system can provide the pruned retrieval tokens (416). In some implementations, the pruned retrieval tokens can be aggregated into a data structure stored in computer memory. The data structure can access the pruned retrieval tokens stored in computer memory and transmit the data structure via a network to the content provider. In some implementations, the data processing system can transmit an indication of each of the retrieval tokens which were removed from the plurality of retrieval tokens received in step (402). In some implementations, the data processing system can provide estimated traffic values (e.g., expected views based on past performance, number of visitors of an information resource, etc.) for each of the plurality of retrieval tokens based on the estimated traffic value corresponding to each predicted request associated with the respective plurality of retrieval tokens.

Figure 5:
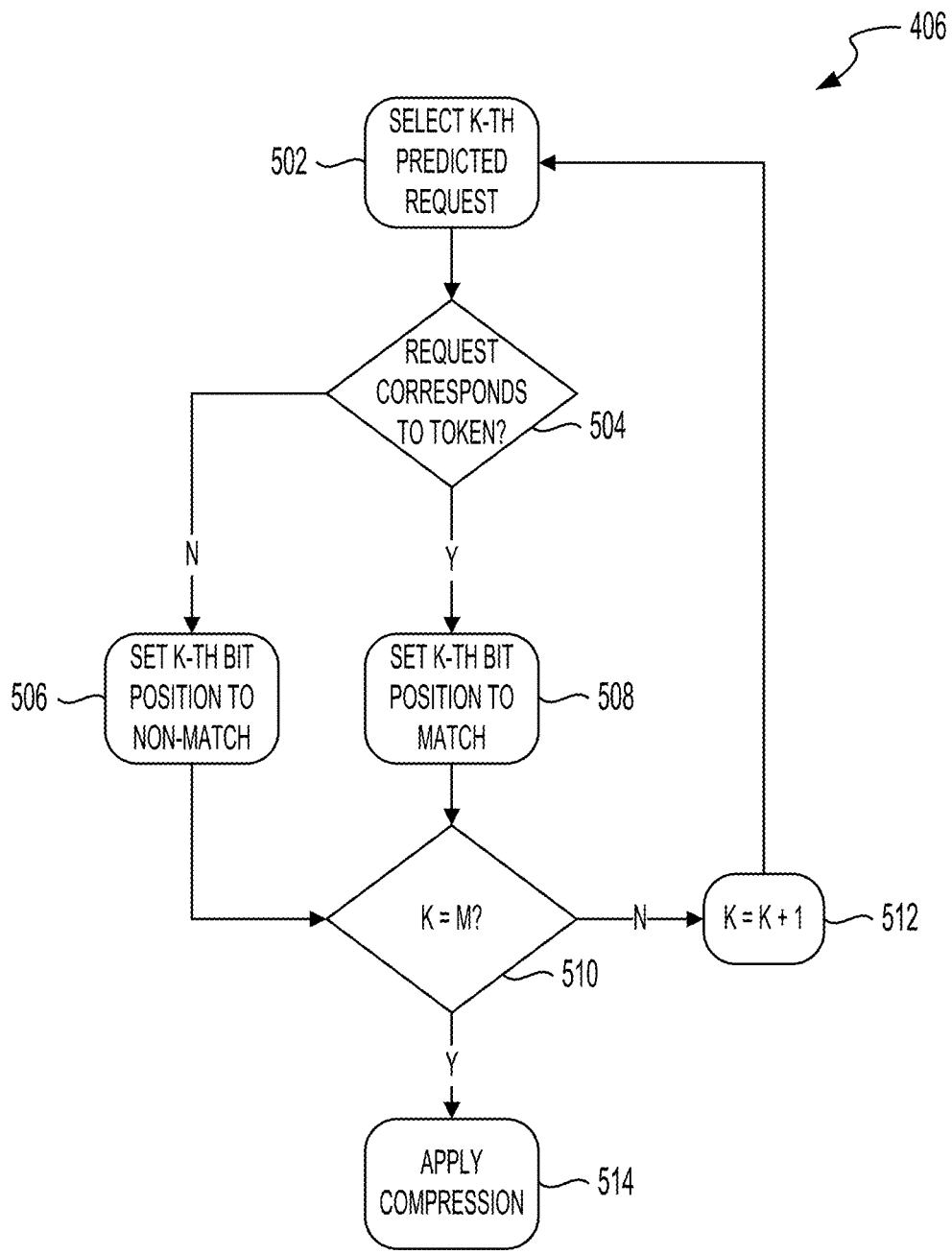
FIG. 5 shows a flow diagram of a method of constructing a bit string for a retrieval token based on predicted requests.

Referring now to FIG. 5, illustrated is an example method 408 of generating a bit string for a retrieval token. The method 408 can be performed as a part of step (408) of method 400 described herein above in conjunction with FIG. 4. The method 408 can be executed, for example, by the data processing system 105, the computer system 700 described herein in conjunction with FIG. 7, or any other computing device described herein. The data processing system can select the k-th predicted request (502). The data processing system can determine whether the predicted request corresponds to the retrieval token (504). The data processing system can set the k-th bit string position to a non-match value (506).

The data processing system can set the k-th bit string position to a match value (508). The data processing system can determine whether the counter register k is equal to the number of predicted requests m (510). The data processing system can increment the counter register k (512). The data processing system can apply compression to the bit string (514).

The data processing system can select the k-th predicted request (502). In order to construct a bit string for a respective retrieval token, the data processing system must iterate over each of the plurality of predicted requests retrieved in step (406) described herein in conjunction with FIG. 4. The bit string can represent which of the plurality of predicted requests are associated with the retrieval token, and which of the plurality of predicted request are not associated with the retrieval token. In some implementations, the data processing system can iteratively loop through each of the plurality of predicted requests based on a counter register k. Each of the plurality of predicted requests may be indexed in a data structure by an index value (e.g., index 0, index 1, index 2, etc.). To process a predicted requests, the data processing system can select the predicted request which includes an index value which is equal to the counter register k. If it is the first iteration of the loop, the counter register k may be initialized to an initialization value (e.g. k=0) before selecting the k-th predicted request. Selecting the predicted request can include copying the data associated with the predicted request to a different region of computer memory, for example a working region of memory.

The data processing system can determine whether the predicted request corresponds to the retrieval token (504). To determine the associations for a predicted request, the data processing system can access a region of computer memory including information about the associations for each of the plurality of predicted requests. The data processing system can retrieve, from a database (e.g., database 120), each of the associations for a predicted request. In some implementations, the database can include a lookup table indexed by each retrieval token. The data processing system can access the database using the retrieval token as a key value, and retrieve the list of associated predicted requests corresponding to the retrieval token. If the selected predicted request is included in the list of associated predicted requests, the data processing system can execute step (508). If the selected predicted request is not included in the list of associated predicted requests, the data processing system can execute step (506).

The data processing system can set the k-th bit string position to a non-match value (506). In some implementations, the data processing system can access a region of memory representing a bit string associated with the retrieval token. The bit string may be resident in a data structure in computer memory (e.g. the database 120 or memory 725 described herein in conjunction with FIG. 7). In some implementations, setting a non-match value can include setting the bit position corresponding to the counter register k to a binary value (e.g., a '0' or a '1'). For example, if the non-match value is determined to be a '1,' the data processing system can set the k-th bit position of the bit string corresponding to the retrieval token to a '1.' If the non-match value is determined to be a '0,' the data processing system can set the k-th bit position of the bit string corresponding to the retrieval token to a '0.' In some implementations, the non-match value may be another type of value which indicates the predicted request is not associated with the retrieval token.

The data processing system can set the k-th bit string position to a match value (508). In some implementations, the data processing system can access a region of memory representing a bit string associated with the retrieval token. The bit string may be resident in a data structure in computer memory (e.g. the database 120 or memory 725 described herein in conjunction with FIG. 7). In some implementations, setting a match value can include setting the bit position corresponding to the counter register k to a binary value (e.g., a '0' or a '1'). For example, if the match value is determined to be a '1,' the data processing system can set the k-th bit position of the bit string corresponding to the retrieval token to a '1.' If the match value is determined to be a '0,' the data processing system can set the k-th bit position of the bit string corresponding to the retrieval token to a '0.' In some implementations, the match value can be a value which is greater than one, for example an estimated traffic value associated with the predicted request.

The data processing system can determine whether the counter register k is equal to the number of predicted requests m (510). To determine whether the data processing system has set a match value or a non-match value in the bit string for each the predicted requests, the data processing system can compare the counter register k used to select each predicted request to the total number of predicted requests m. If the counter register k is not equal to (e.g., less than) the total number of predicted requests m, the data processing system can execute step (512). If the counter register k is equal to (e.g., equal to or greater than) the total number of predicted requests m, the data processing system can execute step (514).

The data processing system can increment the counter register k (512). In some implementations, the data processing system can add one to the register k to indicate the next unprocessed predicted request in the plurality of predicted requests. In some implementations, the data processing system can set the counter register k to a memory address value (e.g., location in computer memory) of the next unprocessed predicted request. In some implementations, the memory address value of the next unprocessed predicted request can be included in the data structure at the location of the current (e.g., selected) predicted request. After incrementing the value of the counter register k, the data processing system can execute step (502) of the method 406.

The data processing system can apply compression to the bit string (514). In some implementations, to reduce the storage requirements and the computational burden of processing each bit string for each retrieval token, the data processing system can select certain portions of the bit string based on selection criteria to create a pruned bit string. In some implementations, the pruned bit string can be smaller than the un-compressed bit string. In some implementations, the selection criteria can be based on pseudo-random selection.

For example, the data processing system may pseudo-randomly determine a number of bit positions to select from the bit string created for the retrieval token based on the plurality of predicted requests. In some implementations, the data processing system can insert the selected positions from the bit string into a pruned bit string. For example, the data processing system can select the first one-hundred (e.g., position 0 to position 99) of the bit string to create a pruned bit string. In some implementations, the pruned bit string can be used in place of the bit string for further processing by steps of the method 400 described herein above in conjunction with FIG. 4, and by the steps of the method 414 described herein below in conjunction with FIG. 6.

Figure 6:
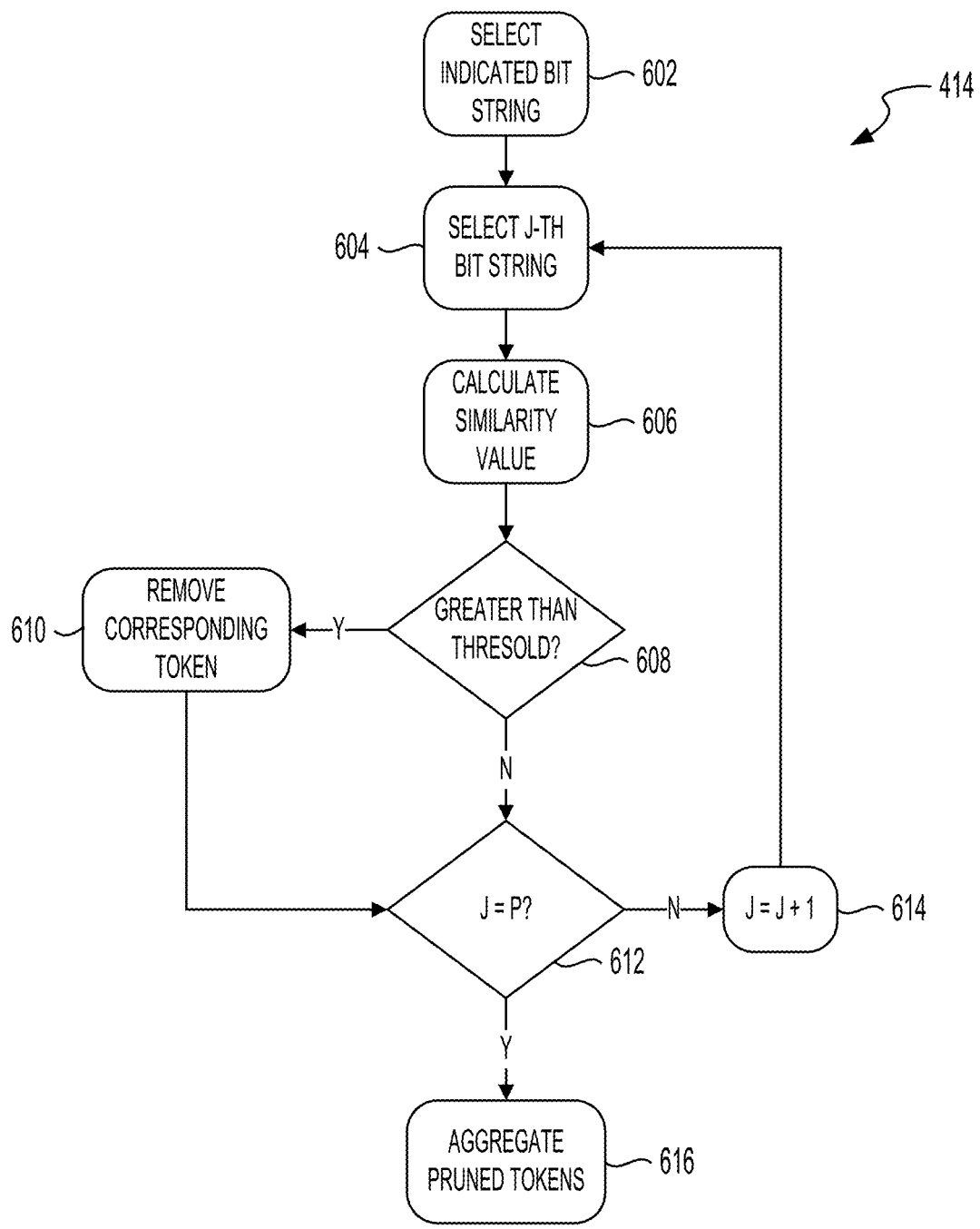
FIG. 6 shows a flow diagram of a method of pruning retrieval tokens from sets of retrieval tokens.

Referring now to FIG. 6, illustrated is an example method 414 of pruning retrieval tokens based on bit strings. The method 414 can be performed as a part of step (414) of method 400 described herein above in conjunction with FIG. 4. The method 414 can be executed, for example, by the data processing system 105, the computer system 700 described herein in conjunction with FIG. 7, or any other computing device described herein. The data processing system can select an indicated bit string (602). The data processing system can select the j-th bit string (604). The data processing system can calculate a similarity value between the indicated bit string and the selected bit string (606). The data processing system can determine whether the similarity value is greater than a threshold (608). The data processing system can remove the retrieval token corresponding to the j-th bit string (610). The data processing system can determine whether the counter register j is equal to the number of bit strings p (612). The data processing system can increment the counter register j (614). The data processing system can aggregate the pruned tokens (616).

The data processing system can select an indicated bit string (602). The indicated bit string can be associated with the first retrieval token (e.g., the top negative retrieval token) indicated in step (404) of method 400 described herein above in conjunction with FIG. 4. In some implementations the data processing system can access a data structure containing the bit strings, and select the indicated bit string based on an index value included in the first retrieval token. In some implementations, the data structure including the bit strings may be indexed by each associated retrieval token, and therefore the indicated bit string may be selected using the first retrieval token as an index value. Selecting the indicated bit string can include copying the indicated bit string to a different region of memory (e.g., working memory on the data processing system). In some implementations, the data processing system can access a database (e.g., the database 120) to select the indicated bit string.

The data processing system can select the j-th bit string (604). In order to determine whether a retrieval token can be removed from the plurality of retrieval tokens, the data processing system must iterate over each of the plurality of bit strings associated with each retrieval token received in step (402) described herein above in conjunction with FIG. 4. The bit string can represent which of the plurality of predicted requests are associated with the retrieval token, and which of the plurality of predicted request are not associated with the retrieval token. In some implementations, the data processing system can iteratively loop through each of the bit strings based on a counter register j. Each of the bit strings may be indexed in a data structure by an index value (e.g., index 0, index 1, index 2, etc.). To process a bit string, the data processing system can select the bit string which includes an index value which is equal to the counter register j. If it is the first iteration of the loop, the counter register j may be initialized to an initialization value (e.g. k=0) before selecting the j-th predicted request. Selecting the predicted request can include copying the data associated with the predicted request to a different region of computer memory, for example a working region of memory. In some implementations, if the j-th bit string is the same as the indicated bit string, the data processing system can increment the counter register j as described herein below in conjunction with step (614). If incrementing the counter register causes the value of j to be equal to or greater than the total number of bit strings p, the data processing system can execute step (616) described herein below.

The data processing system can calculate a similarity value between the indicated bit string and the selected bit string (606). Calculating a similarity value can include performing a bitwise logical operation on the indicated bit string and the selected bit string. For example, the data processing system can perform a logical AND operation using the selected bit string and the indicated bit string as operands to generate a result bit string. The result bit string can include an indication of each of the predicted requests which are associated with the first retrieval token and the retrieval token corresponding to the selected bit string. The data processing system can calculate the similarity value between the indicated bit string and the selected bit string by counting the number of positions in the result bit string which contain a match value. In some implementations, each position in a first bit string and a second bit string may be equal to a weight value, which can be equal to a relevance value. The relevance value can indicate a relevance metric between the corresponding retrieval token and the information resource associated with the predicted request of the respective position in the bit string. In this case, the bit string could be a vector of weight values, which may be integer values or floating point values. To determine a similarity value between two such bit strings, the bit string comparison module 140 can determine whether the relevance values in each position of the first bit string are equal to each respective position of the second bit string within a tolerance value (e.g., 10%, 15%, etc.). In some implementations, the tolerance value may be retrieved from a database (e.g., database 120), received from a content provider, or received from another external computing device. If the two values are equal within the predetermined tolerance value, the bit string comparison module can set the corresponding position of a result bit string (e.g., result bit string 305) to a match value. The bit string comparison module 140 can iteratively compare each of the positions in the first and the second bit strings to determine the full result bit string, and compute the similarity value using the result bit string as detailed herein above.

The data processing system can determine whether the similarity value is greater than a similarity threshold (608). The data processing system can receive the similarity threshold from the content provider (e.g., the content provider 115). In some implementations, the data processing system can access a database (e.g., the database 120) to retrieve the similarity threshold. If the data processing system determines that the similarity value associated with the selected bit string is greater or equal to the similarity threshold, the data processing system can execute step (610) of the method 414. If the data processing system determines that the similarity value associated with the selected bit string is less than the similarity threshold, the data processing system can execute step (612) of the method 414.

The data processing system can remove the retrieval token corresponding to the j-th bit string (610). Based on the similarity to the indicated bit string, the data processing system can remove the retrieval token corresponding to the j-th bit string by accessing a data structure including each of the p bit strings. The data processing system can delete the entry corresponding to the j-th bit string from the data structure including the plurality of retrieval tokens. For example, if the data structure is configured as a linked list, the data processing system can change the pointer of the previous node (e.g., j−1) from the address of the j-th node to the address of the node pointed to by the j-th node. The data processing system may use other data structures to store the plurality of retrieval tokens. In some implementations, the data processing system can store a removal identifier in the entry of the data structure including the j-th bit string. The removal identifier can indicate that the token should not be aggregated into a set of pruned retrieval tokens.

The data processing system can determine whether the counter register j is equal to the number of bit strings p (612). To determine whether the data processing system has compared each bit string to the indicated bit string, the data processing system can compare the counter register j used to select each bit string to the total number of bit strings p. If the counter register j is not equal to (e.g., less than) the total number of bit strings p, the data processing system can execute step (614). If the counter register j is equal to (e.g., equal to or greater than) the total number of bit strings p, the data processing system can execute step (616).

The data processing system can increment the counter register j (614). In some implementations, the data processing system can add one to the register j to indicate the next unprocessed bit string in the plurality of bit strings. In some implementations, the data processing system can set the counter register j to a memory address value (e.g., location in computer memory) of the next unprocessed bit string. In some implementations, the memory address value of the next unprocessed bit string can be included in the data structure at the location of the current (e.g., selected) predicted request. After incrementing the value of the counter register j, the data processing system can execute step (604) of the method 414.

The data processing system can aggregate the pruned tokens (616). The data processing system can allocate a region of memory to store each of the retrieval tokens of the plurality of retrieval tokens which were not removed in step (610). For example, if the original plurality of retrieval tokens included five retrieval tokens, and two were removed in previous steps of method 414, then the data processing system can allocate a memory region for a data structure to contain three retrieval tokens. In some implementations, the data processing system can iteratively determine which of plurality of retrieval tokens are not stored along with a removal identifier. The data processing system can select each of these retrieval tokens and store them in a data structure created to aggregate the pruned retrieval tokens. Accordingly, the data processing system can generate a data structure of pruned retrieval tokens by inserting only those of the plurality of retrieval tokens which were not flagged with a removal identifier.

FIG. 7 shows the general architecture of an illustrative computer system 700 that may be employed to implement any of the computer systems discussed herein in accordance with some implementations. The computer system 700 can be used to provide information via the network 110 for display. The computer system 700 of FIG. 8 comprises one or more processors 820 communicatively coupled to memory 725, one or more communications interfaces 805, and one or more output devices 710 (e.g., one or more display units) and one or more input devices 815. The processors 720 can be included in the data processing system 105 or the other components of the system 700 such as the data processing system 105.

In the computer system 700 of FIG. 7, the memory 725 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 700 of FIG. 7, the data processing systems can include the memory 725 to store information related to the sets of user identifiers, the generated vectors, among others. The processor(s) 720 shown in FIG. 7 may be used to execute instructions stored in the memory 725 and, in so doing, also may read from or write to the memory various information processed and or generated pursuant to execution of the instructions.

The processor 720 of the computer system 700 shown in FIG. 7 also may be communicatively coupled to or control the communications interface(s) 705 to transmit or receive various information pursuant to execution of instructions.

For example, the communications interface(s) 705 may be coupled to a wired or wireless network, bus, or other communication means and may therefore allow the computer system 700 to transmit information to or receive information from other devices (e.g., other computer systems).

While not shown explicitly in the system of FIG. 7, one or more communications interfaces facilitate information flow between the components of the system 700. In some implementations, the communications interface(s) may be configured (e.g., via various hardware components or software components) to provide a website as an access portal to at least some aspects of the computer system 700. Examples of communications interfaces 805 include user interfaces (e.g., web pages), through which the user can communicate with the computer system 800.

The output devices 710 of the computer system 700 shown in FIG. 7 may be provided, for example, to allow various information to be viewed or otherwise perceived in connection with execution of the instructions. The input device(s) 715 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods.

Scope of the systems and methods described herein is thus indicated by the appended claims, rather than the foregoing description, and changes that come within the meaning and range of equivalency of the claims are embraced therein.

What is claimed is:

1. A method for pruning selection criteria from a set of selection criteria based on document space associations, comprising:

receiving, by a data processing system including one or more processors, a plurality of retrieval tokens;

retrieving, by the data processing system, for each retrieval token of the plurality of retrieval tokens, a respective set of predicted requests for content from information resources, wherein the predicted requests are retrieved from a database pre-populated with predicted requests and associated retrieval tokens, and wherein the predicted requests are generated based on historical data indicating which information resources previously requested content associated with each retrieval token;

removing, by the data processing system, based on a number of predicted requests associated with each of the plurality of retrieval tokens, a first retrieval token and a second retrieval token from the plurality of retrieval tokens to create a pruned plurality of retrieval tokens; and providing, by the data processing system, the pruned plurality of retrieval tokens to the content provider computing device.

2. The method of claim 1, wherein each predicted request is associated with a weight value based on an estimated traffic value for the predicted request; and wherein the removing further comprises:

comparing, by the data processing system, each of the plurality of weight values to a predetermined traffic threshold;

selecting, by the data processing system, a pruned plurality of predicted requests, each of the pruned plurality selected from the plurality of predicted requests responsive to the respective weight value being greater than the predetermined traffic threshold;

constructing, by the data processing system, a bit string, wherein each position in the bit string corresponds to a respective one of the pruned plurality of predicted requests, and has a value indicating whether the respective pruned predicted request corresponds to the first retrieval token.

3. The method of claim 1, further comprising removing, by the data processing system, the first retrieval token from the plurality of retrieval tokens to create the pruned plurality of retrieval tokens responsive to a similarity value between a first retrieval token and a second retrieval token of the plurality of retrieval tokens being less than the predetermined threshold.

4. The method of claim 1, wherein each of the plurality of retrieval tokens is associated with a content rating value, and wherein retrieving the plurality of predicted requests is based on the first retrieval token, and the content rating value associated with the first retrieval token.

5. The method of claim 1, wherein providing the pruned plurality of retrieval tokens to the content provider computing device further comprises providing an indication of the first retrieval token and the second retrieval token.

6. The method of claim 1, wherein providing the pruned plurality of retrieval tokens to the content provider computing device further comprises:

retrieving, by the data processing system, a relevance value for the pruned plurality of retrieval tokens based on the pruned plurality of retrieval tokens; and providing, by the data processing system, a relevance value based on the pruned plurality of retrieval tokens to the content provider computing device.

7. A system comprising a data processing system comprising one or more processors, the data processing system configured to:

receive a plurality of retrieval tokens;

retrieve, for each retrieval token of the plurality of retrieval tokens, a respective set of predicted requests for content from information resources, wherein the predicted requests are retrieved from a database pre-populated with predicted requests and associated retrieval tokens, and wherein the predicted requests are generated based on historical data indicating which information resources previously requested content associated with each retrieval token;

remove, based on a number of predicted requests associated with each of the plurality of retrieval tokens predicted requests, a first retrieval token and a second retrieval token from the plurality of retrieval tokens to create a pruned plurality of retrieval tokens; and provide the pruned plurality of retrieval tokens to the content provider computing device.

8. The system of claim 7, wherein each predicted request is associated with a weight value based on an estimated traffic value for the predicted request;

and wherein the data processing system is further configured to:

compare each of the plurality of weight values to a predetermined traffic threshold;

select a pruned plurality of predicted requests, each of the pruned plurality selected from the plurality of predicted requests responsive to the respective weight value being greater than the predetermined traffic threshold;

construct a bit string, wherein each position in the bit string corresponds to a respective one of the pruned plurality of predicted requests, and has a value indicating whether the respective pruned predicted request corresponds to the first retrieval token.

9. The system of claim 7, wherein the data processing system is further configured to:

remove the first retrieval token from the plurality of retrieval tokens to create the pruned plurality of retrieval tokens responsive to a similarity value between a first retrieval token and a second retrieval token of the plurality of retrieval tokens being less than the predetermined threshold.

10. The system of claim 7, wherein each of the plurality of retrieval tokens is associated with a content rating value, and wherein the data processing system is further configured to retrieve the plurality of predicted requests based on the plurality of retrieval tokens, and the content rating value associated with the first retrieval token.

11. The system of claim 7, wherein data processing system is further configured to: provide an indication of the first retrieval token and the second retrieval token.

12. The system of claim 7, wherein data processing system is further configured to:

retrieve a relevance value for the pruned plurality of retrieval tokens based on the pruned plurality of retrieval tokens; and provide the relevance value to the content provider computing device.

* * * * *